(12) United States Patent
Kordelin

(10) Patent No.: US 6,763,782 B1
(45) Date of Patent: Jul. 20, 2004

(54) LAVATORY FOR PETS

(75) Inventor: Tapio Kordelin, Turku (FI)

(73) Assignee: Oy Shippax Ltd (FI)

( * ) Notice: Subject to any disclaimer, the term of this patent is extended or adjusted under 35 U.S.C. 154(b) by 0 days.

(21) Appl. No.: 09/701,003

(22) PCT Filed: May 21, 1999

(86) PCT No.: PCT/FI99/00437
§ 371 (c)(1),
(2), (4) Date: Nov. 22, 1999

(87) PCT Pub. No.: WO99/62329
PCT Pub. Date: Dec. 9, 1999

(30) Foreign Application Priority Data

May 29, 1998 (FI) .................................................. 981201

(51) Int. Cl.[7] ........................... A01K 29/00; A01K 1/01
(52) U.S. Cl. ...................................... 119/166; 119/451
(58) Field of Search ................................ 119/164, 161, 119/165, 166, 447, 442, 451, 479, 450, 509, 530; 15/38, 39, 88.2, 93.1, 104.53, 104.8; 294/1.3

(56) References Cited

U.S. PATENT DOCUMENTS

| | | | | |
|---|---|---|---|---|
| 2,383,326 A | * | 8/1945 | Lovell | 119/458 |
| 2,988,204 A | * | 6/1961 | Sutherland | 198/743 |
| 3,021,819 A | * | 2/1962 | Krahn | 119/451 |
| 3,343,521 A | * | 9/1967 | Moores | 119/515 |
| 3,718,119 A | * | 2/1973 | Stevenson | 119/442 |
| 3,919,976 A | | 11/1975 | Meyer et al. | |
| 4,067,297 A | | 1/1978 | Johnson | |
| 4,123,992 A | | 11/1978 | Laurenz | |
| 4,235,197 A | * | 11/1980 | Curtis et al. | 119/530 |
| 4,574,735 A | * | 3/1986 | Hohenstein | 119/161 |
| 4,696,257 A | * | 9/1987 | Neary et al. | 119/166 |
| 4,706,607 A | * | 11/1987 | Ijichi et al. | 119/447 |
| 5,226,388 A | | 7/1993 | McDaniel | |
| 5,272,999 A | | 12/1993 | Nussle | |
| 5,580,111 A | * | 12/1996 | Bohn | 294/1.3 |
| 5,931,119 A | * | 8/1999 | Nissim et al. | 119/163 |

FOREIGN PATENT DOCUMENTS

| | | | | |
|---|---|---|---|---|
| EP | 0154540 | | 11/1985 | |
| EP | 377414 A1 | * | 7/1990 | A01K/1/01 |
| EP | 0721731 | | 7/1996 | |

* cited by examiner

Primary Examiner—Son T. Nguyen
(74) Attorney, Agent, or Firm—Burns, Doane, Swecker & Mathis, LLP

(57) ABSTRACT

A device intended for use as a lavatory for pets includes a round basin for sand; and a cleaning unit, with the cleaning unit substantially covering a sector of the basin and the cleaning unit adapted for cleaning the sand. The cleaning unit includes components used in the collecting and processing of waste from the pets, with the components including at least a frame and a separating mechanism fastened to the frame for separating waste and sand. The basin and the cleaning unit are arranged to be movable in relation to each other, with one of the cleaning unit and the basin being rotatable around a vertical axle passing through the center of the basin. All of the components of the cleaning unit used in the collecting and processing of waste from the pets are located above the basin.

10 Claims, 4 Drawing Sheets

LAVATORY FOR PETS

FIELD OF THE INVENTION

The object of the invention is a lavatory intended for pets, particularly for dogs and cats.

BACKGROUND OF THE INVENTION

The habit of keeping pets in city-like circumstances is continuously increasing. Pavements, parks, lawns and yards become dirty by the excrements of the pets, which is an increasing hygienic problem. A way to tackle the problem is that a person taking out a dog picks up the dog's excrements in a container or plastic bag which the person carried with him. Obviously such a cleaning operation is unpleasant and therefore it is easily left undone.

The European patent publication EP 154540 describes a lavatory for small pets, such as cats, intended to be located indoors. Above a basin there is a movable rake which transports the solid wastes to the edge of the basin, where they fall down into a rotating drum located under the basin, whereby the drum functions as a waste collecting container, which contains some odour-removing substance. The drum can be detached from the device, so that it may be emptied from time to time.

The European patent publication EP 721731 presents a cat sand plate with a manure fork as a means for separating sand and waste.

In the apparatus presented in the patent publication EP 154540 the waste collecting and processing container is located below the basin. An arrangement of that kind is not suitable for large lavatories particularly for dogs, intended to be located outdoors or in covered public places.

SUMMARY OF THE INVENTION

The object of this invention is to provide a lavatory for dogs and cats which is particularly intended to be located outdoors or in covered public places, and where the diameter of the sand basin is large, preferably about 2.5 to 3 m.

The object is particularity to provide a device which is reliable and easily and rapidly cleaned, and where a person does not have to be close to the pet excrements. The operation and maintenance of a device of this kind require that all essential components for collecting and processing the waste are located above the basin.

Thus the object of the invention is a device intended as a lavatory for pets which comprises
- a round basin for sand, and
- a cleaning unit, which substantially covers a sector of the basin, said cleaning unit being intended for cleaning the sand and comprising a frame and means fastened to the frame for separating waste and sand, whereby
- the basin and the cleaning unit are arranged to be movable in relation to each other, so that the cleaning unit or basin is rotatable around a vertical axle passing through the center of the basin. The invention is characterized in that all components of the cleaning unit are located above the basin.

BRIEF DESCRIPTION OF THE DRAWINGS

The invention is described below with reference to the enclosed drawings, in which.

DETAILED DESCRIPTION OF THE PREFERRED EMBODIMENTS

Figure 1:
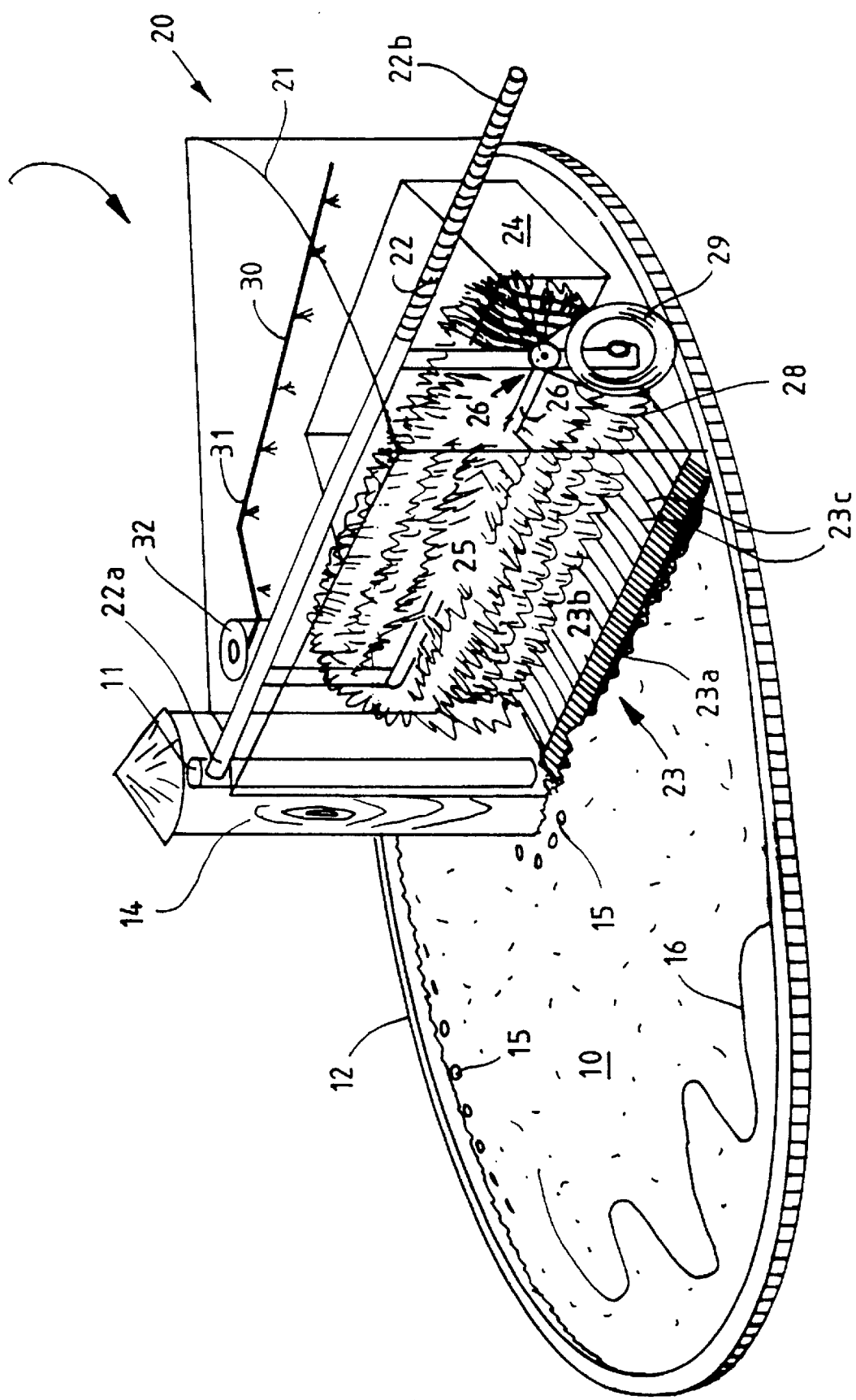
FIG. 1 shows in a perspective view an embodiment of the device according to the invention.
Figure 2:
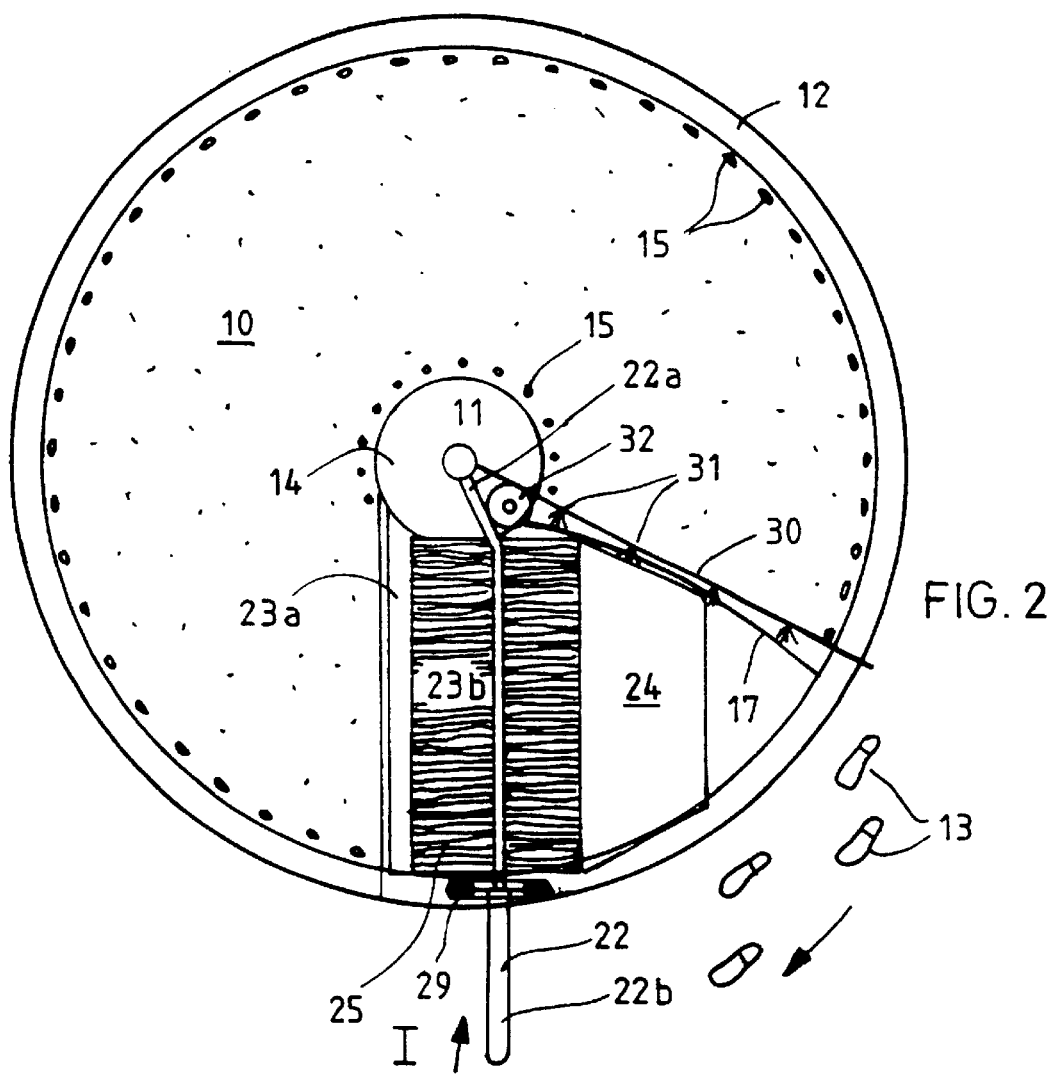
FIG. 2 shows the device of FIG. 1 in a horizontal section.
Figure 3:
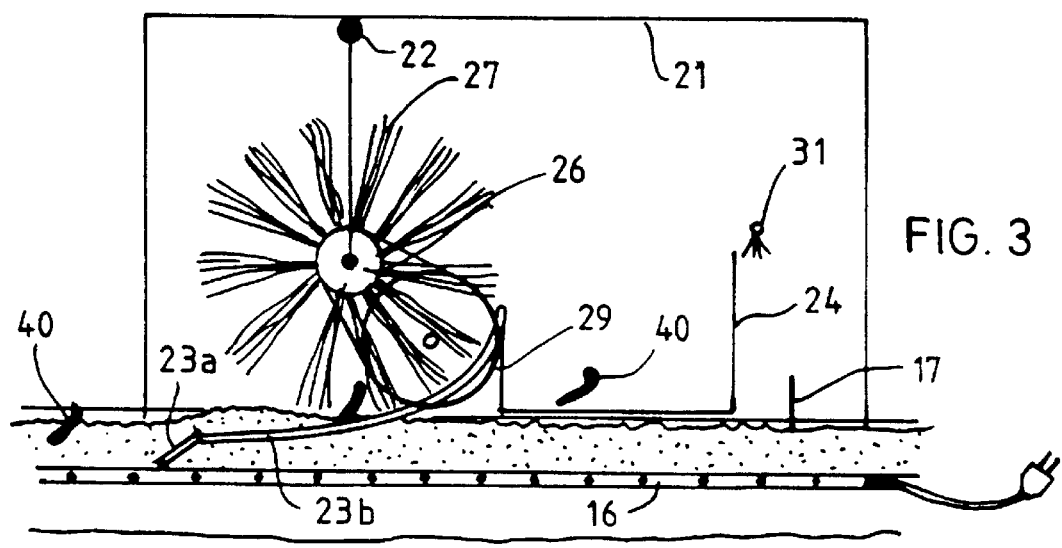
FIG. 3 shows a vertical section in the direction 1 of FIG. 2.

The FIGS. 1 to 5 show a device according to the invention which comprises a round basin 10, which contains sand, and a cleaning unit 20 arranged above the basin and intended for the cleaning of the sand. The horizontal section of the cleaning unit corresponds approximately to a certain sector of the basin. The frame 21 of the cleaning unit can be an open crate, or at least partly box-like. A rail 22 extending in the horizontal direction is fastened to the frame 21 of the cleaning unit 20, whereby the first end 22a of the rail is connected to a vertical axle 11 passing through the center of the basin and the second end 22b extends outside the periphery 12 of the basin. In this solution the first end 22a of the rail 22 is supported by the vertical axle 11 so that said end 22a can rotate around the center of the basin, either so that the actual axle arm is arranged to be rotating, or so that the end 22a of the rail is rotatably carried in a bearing on a fixed axle arm. When a person grips the outer end 22b of the rail 22 and walks in the direction of the arrow in FIG. 2 (the footprints are marked by the reference numeral 13) the whole cleaning unit 20 moves in relation to the basin 10.

Required separating means are connected to the frame 21 in order to separate the pet excrements from the sand. In the solution shown in the FIGS. 1 to 3 the separating means comprise a manure fork 23, which at the front edge has a blade 23a (see FIG. 3) extending to the bottom of the basin. Behind the blade 23a there is attached a grating 23b, which in the solution of the figure comprises parallel bars 23c which are not arranged densely. When the cleaning unit is rotated around the center of the basin the fork blade 23a lifts the sand and any excrements 40 in it. The grating 23b is constructed so that it retains the wastes on the upper side and lets the sand fall through. The separating means also includes a waste container 24 connected behind the fork, whereby the container is fastened after the grating 23b of the manure fork. The excrements 40 and a small amount of sand accumulate in the waste container 24, which can be for instance a plastic bag, a basin containing chemicals which break down the waste, or if there is a sewer at the center of the basin, it can be an inclined channel which leads the waste directly to the sewer.

The separating means will preferably comprise a brush or other means which facilitates the transport of the waste along the grating 23b to the waste container 24. In the solution of FIG. 1 this means is a horizontal brush drum 25 arranged above the grating 23b. The brush drum 25 provided with bristles 27 rotates on its axle 26. The axle of rotation 26 is carried in a bearing in the frame 21 of the cleaning unit so that the rotational axis extends perpendicularly in relation to the direction of motion of the fork 23. In the solution of the figure the rotation of the axle 26 is generated so that the end 26' of the axle, which is directed toward the periphery 12 of the basin, is connected via a belt 28 to a wheel 29, whereby the wheel is carried in a bearing in the frame 21 of the cleaning unit and touching the ground. When the cleaning unit is moved in the direction of the arrow in FIG. 2 the rotational motion of the wheel 29 is transmitted to the brush drum 25, which rotates in the direction indicated in FIG. 3. The bristles of the brush drum transport the waste along the fork 23 to the waste container 24. The propagation of sand into the waste container is prevented for instance by arranging the grating 23b to rise against the waste container 24 in the manner shown in FIG. 3.

The reference numeral 30 indicates a pipe provided with nozzles 31 and mounted on the frame 21 of the cleaning unit. The nozzles can spray disinfectant from the container 32 on the cleaned sand. The rotation axle 26 of the brush drum 25 can drive the disinfectant pump, whereby the spraying occurs when the cleaning unit is moved.

The pole 14 surrounding the vertical axle 11 of the basin is intended for male dogs. The bottom of the basin is provided with holes 15 at the periphery and at the central area in order to remove moisture. At the bottom of the basin there may be an electrical resistance 16 in order to melt any ice and to dry the sand.

The location of the separating means (manure fork, brush drum and waste container) must be such that they can be located within the circle formed by the basin 10. In order to obtain a sufficiently long grating section 23b the rail 22 preferably forms an angle in the manner shown in FIG. 2. The blade 23a of the fork is slightly wider than the grating section 23b of the fork, as otherwise there would be left an untreated sand area close to the pole 14.

To the frame of the cleaning unit it is also possible to fasten a drag 17 for leveling the sand.

Figure 4:
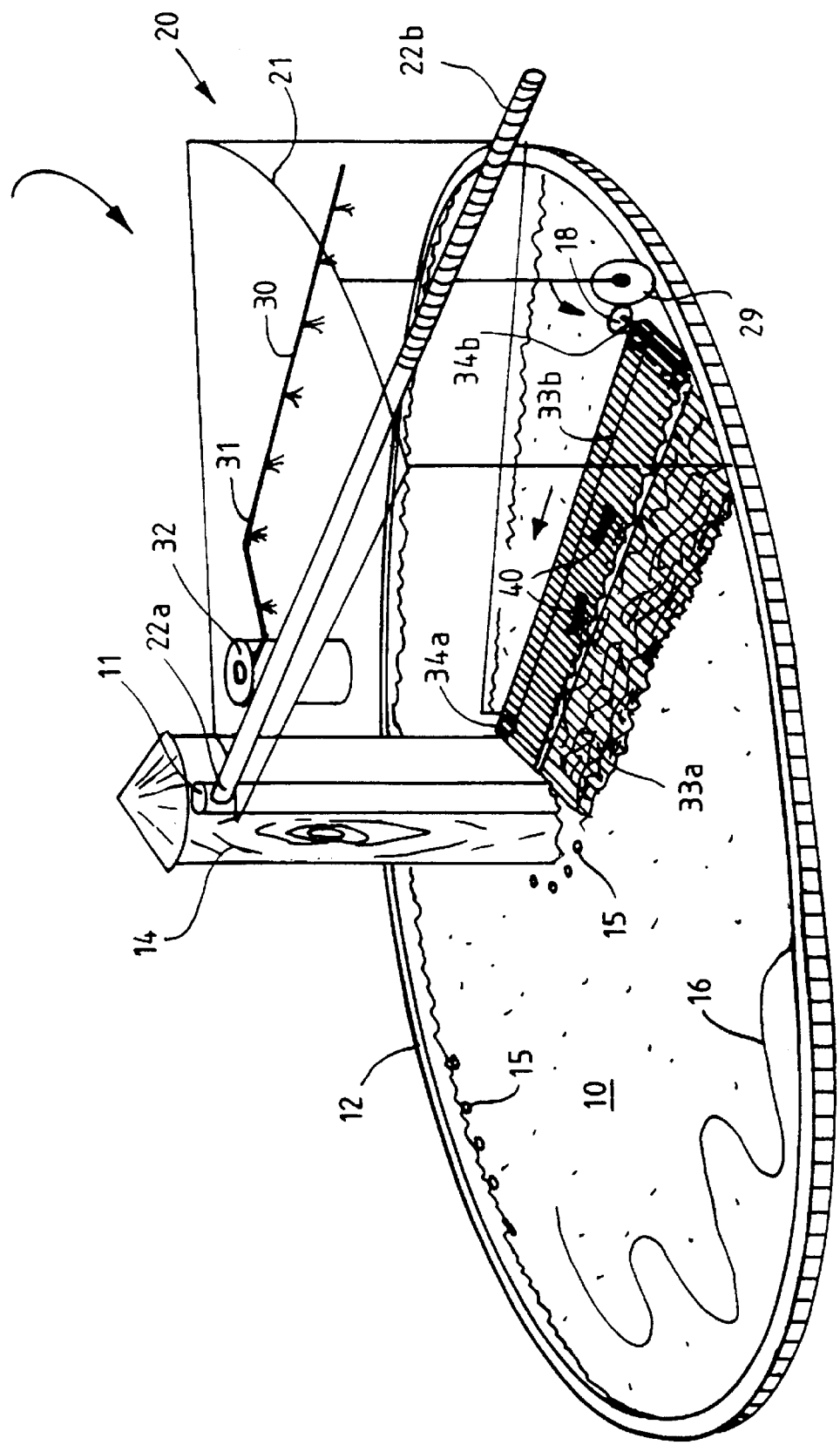
FIG. 4 shows in a perspective view another embodiment of the device according to the invention.
Figure 5:
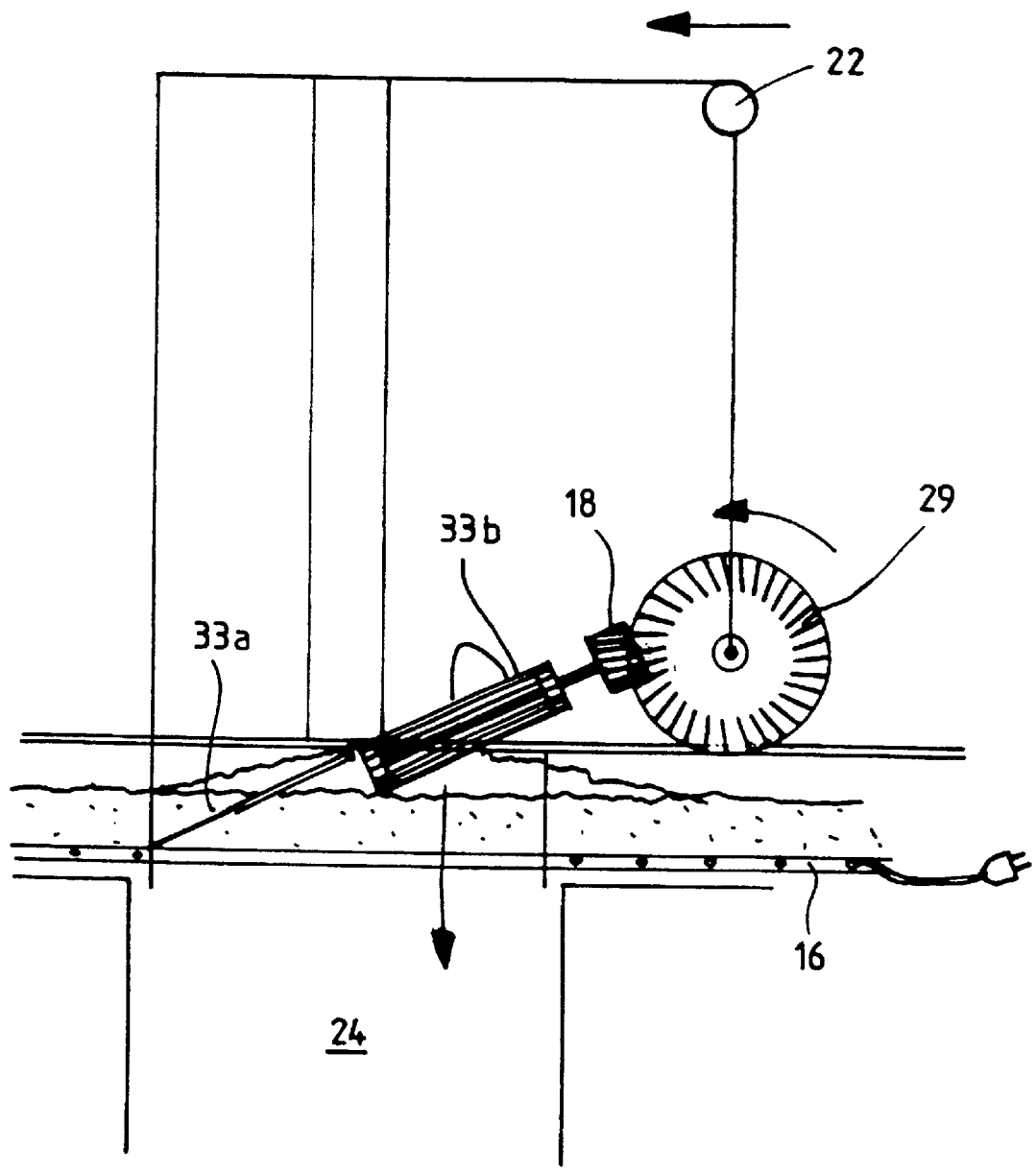
FIG. 5 shows the device of FIG.4 in a vertical section as seen from the side.

The FIGS. 4 and 5 show another embodiment of the invention where the separating means of the cleaning unit comprise a comb section 33a which is supported on the frame of the unit and inclined toward the bottom of the basin, whereby the comb section filters the sand. Behind the comb section there is arranged a wire conveyor belt 33b which moves in the direction of the arrow in FIG. 4, that is, in the direction of the basin radius, so that the upper part of the belt moves towards the center of the basin. The excrements 40 are retained on the upper side of the belt, and fall then either into a sewer or a container 24 arranged below the basin. The belt 33b moves around the axles 34a. 34b. The axle 34b located close to the basin's periphery is the driving axle which receives its rotational motion from the rotational motion of a geared driving wheel 29 carried in a bearing via a gear 18 to the frame 21 and touching the ground.

The bottom profile of the basin 10 can be slightly conical in order to lead water and stale to the central region of the basin, which suitably contains an opening leading to a sewer.

A person taking out a dog can ensure that the device is clean for the dog by rotating the cleaning unit one turn around the basin. After using the basin the person can again turn the cleaning unit one turn, so that the sand is clean for the next pet.

The device can also be covered, whereby the sand is better kept dry. The sand can be ordinary unscreened gravel, or a fraction screened from it, expanded clay, or cat sand which effectively absorbs moisture.

The essential fact is that the basin 10 and the cleaning unit 20 are arranged to be movable in relation to each other. Alternatively this may be arranged so that the cleaning unit is stationary and the actual basin rotatable around its center. In such an alternative the rotational motion of the basin is most suitably provided by an electric motor.

On the other hand, if the cleaning unit is manually moved in relation to a stationary sand basin according to the enclosed figures it is possible, if desired, to fasten two push rods to the unit's frame 21, whereby two persons can handle the motion of the unit.

The rotational motion of the brush drum and the motion of the disinfectant pump can also be generated with the aid of an electric motor.

The diameter of the basin is suitably 2.5 to 3 m.

The above described device is well suited to be placed in parks and yards.

The above mentioned embodiment of the invention are only examples of the realization of the inventive idea. To a person skilled in the art it is obvious that different embodiments of the invention may vary within the scope of the claims presented below.

What is claimed is:

1. A device intended as a lavatory for pets, comprising:
   a round basin for sand; and
   a cleaning unit, said cleaning unit substantially covering a sector of the basin and said cleaning unit adapted for cleaning the sand, said cleaning unit comprising components used in the collecting and processing of waste from the pets, said components comprising at least a frame, separating means fastened to the frame for separating waste from sand, and a conveyor belt arranged to transport the waste separated by the separating means;
   the basin and the cleaning unit being arranged to be movable in relation to each other, one of the cleaning unit and the basin being rotatable around a vertical axis passing through the center of the basin; and
   all of the components of the cleaning unit used in the collecting and processing of waste from the pets are located above the basin wherein the frame of the cleaning unit is supported by a rail, said rail extending from the vertical axis of the basin to a point outside of the periphery of the basin, and said rail being rotatable around the vertical axis.

2. A device intended as a lavatory for pets, comprising:
   a round basin for sand; and
   a cleaning unit, said cleaning unit substantially covering a sector of the basin and said cleaning unit adapted for cleaning the sand, said cleaning unit comprising components used in the collecting and processing of waste from the pets, said components comprising at least a frame, separating means fastened to the frame for separating waste from sand, and a belt arranged to arrive the waste separated by the separating means;
   the basin and the cleaning unit being arranged to be movable in relation to each other, one of the cleaning unit and the basin being rotatable around a vertical axis passing through the center of the basin; and
   all of the components of the cleaning unit used in the collecting and processing of waste from the pets are located above the basin wherein the separating means of the cleaning unit comprises a manure fork supported by the frame, the fork having a blade extending to the bottom of the basin and a grating arranged behind the blade, and the cleaning unit further includes a waste container arranged behind the fork.

3. The device according to claim 2, wherein a brush drum is arranged above the grating, the brush drum having an axle of rotation, said axle of rotation of said brush drum being carried in a bearing mounted on the frame of the cleaning unit, and said axle of rotation being perpendicular to the direction of motion of the fork, the end of the axle of rotation of the brush drum directed toward the periphery of the basin being connected via said belt to a wheel, said wheel being rotatably supported by a bearing mounted on the frame, and said wheel touching the ground.

4. A device intended as a lavatory for pets, comprising:

- a round basin for sand; and
- a cleaning unit, said cleaning unit substantially covering a sector of the basin and said cleaning unit adapted for cleaning the sand, said cleaning unit comprising components used in the collecting and processing of waste from the pets, said components comprising at least a frame, separating means fastened to the frame for separating waste from sand, and a conveyor belt arranged to transport the waste separated by the separating means;
- the basin and the cleaning unit being arranged to be movable in relation to each other, one of the cleaning unit and the basin being rotatable around a vertical axis passing through the center of the basin; and
- all of the components of the cleaning unit used in the collecting and processing of waste from the pets are located above the basin wherein the separating means of the cleaning unit comprises a comb section which is supported by the frame and inclined toward the bottom of the basin, and the conveyor belt comprises a wire conveyor belt which is arranged behind the comb section and which has an upper part moving in the radial direction of the basin toward the center of the basin.

5. The device according to claim 4, wherein the wire conveyor belt is arranged to move around axles, with one of said axles being close to the periphery of the basin and being a driving axle, said driving axle being rotationally driven through a gear arrangement by a driving wheel mounted on a bearing connected to the frame and touching the ground.

6. The device according to claim 4, wherein a pipe provided with nozzles is arranged in the frame of the cleaning unit behind the separating means in order to spray disinfectant on the cleaned sand.

7. The device according to claim 4, wherein a pole is provided at the center of the basin.

8. The device according to claim 4, wherein the bottom of the basin is perforated in some places to remove moisture.

9. The device according to claim 4, wherein the bottom of the basin is provided with an electrical resistance for heating.

10. The device according to claim 8, wherein the bottom of the basin is perforated at the periphery and central area of the basin.

* * * * *